April 23, 1935.  R. E. NEWELL ET AL  1,998,818

THERMOSTAT

Filed April 3, 1934  3 Sheets-Sheet 1

INVENTORS

April 23, 1935.　　　R. E. NEWELL ET AL　　　1,998,818
THERMOSTAT
Filed April 3, 1934　　　3 Sheets-Sheet 2
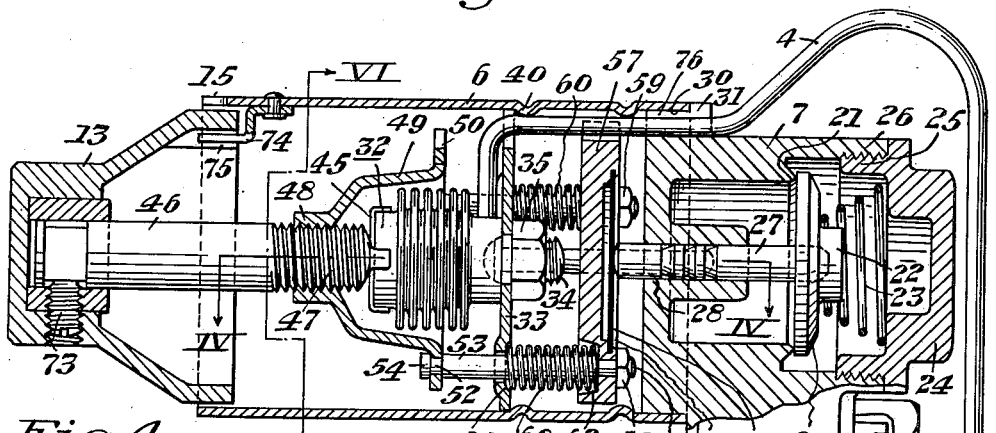
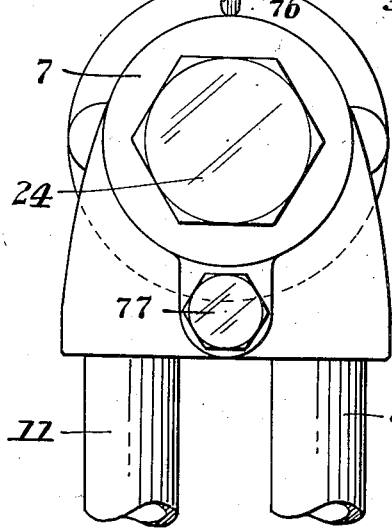
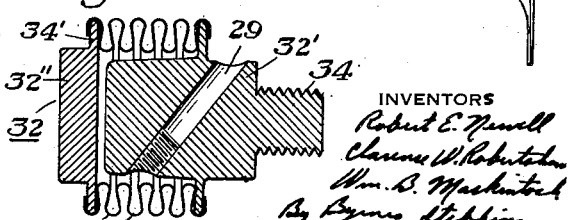
INVENTORS
Robert E. Newell
Clarence W. Robertson
Wm. B. Mackintosh
By Byrnes, Stebbins & Blenko
attorneys Patented Apr. 23, 1935

1,998,818

UNITED STATES PATENT OFFICE 1,998,818

THERMOSTAT

Robert E. Newell, Irwin, and Clarence W. Robertshaw, Youngwood, Pa., and William B. Mackintosh, San Francisco, Calif., assignors to Robertshaw Thermostat Company, Youngwood, Pa., a corporation of Pennsylvania Application April 3, 1934, Serial No. 718,758

8 Claims. (Cl. 236—15)

Our invention relates broadly to thermal control, and more particularly to certain new and useful improvements in thermostats used for the purpose of controlling and regulating temperatures by effecting control of a controlling element such as a valve, a switch, or the like.

By our invention, we provide an improved thermostatic structure which may be used for a large variety of control purposes, and which may be readily installed under widely varying conditions. The structure which we provide is particularly advantageous in that the operating parts for operating the control means are not subject to corrosion by the gas or other heating fluid which may be used, as the structure is so arranged that the operating parts are located without the corrosive atmosphere. Other advantages of the structure which we provide will be pointed out hereinafter.

The improved thermostatic structure which we provide by our invention is preferably of the bellows type having a capillary tube connecting the bellows and the bulb, the bulb being located in the medium the temperature of which is to be controlled. The thermostat which we provide by our invention may be used for operating control devices of various types and is particularly adaptable for use in connection with the operation of a valve or the like adapted to control the flow of the heating fluid for supplying heat to the medium or chamber, the temperature of which is to be controlled. Our invention is particularly adapted for use in the control of oven temperatures in ranges or the like and in the drawings we have illustrated our structure as applied to a gas range, the thermostat being adapted to control the operation of the valve for supplying fuel to the oven burner.

In the drawings, we have shown a preferred embodiment of our invention and one modification thereof. It will be understood, however, that our invention is not limited to the particular structures shown in the drawings and that it may be adapted for use in connection with the control of temperatures in devices other than ranges, and, furthermore, may be used for operating control devices other than valves.

In the drawings—

Figure 3 is a vertical sectional view through the structure which we provide, showing it mounted on a valve, the operation of which is to be controlled;

Figure 4 is a partial sectional view taken along the line IV—IV of Figure 3;

Figure 5 is a rear elevational view of the structure shown in Figure 3;

Figure 6 is a sectional view taken along the line VI—VI of Figure 3;

Figure 6a is a sectional view through the bellows for operating the control means;

Figure 1:
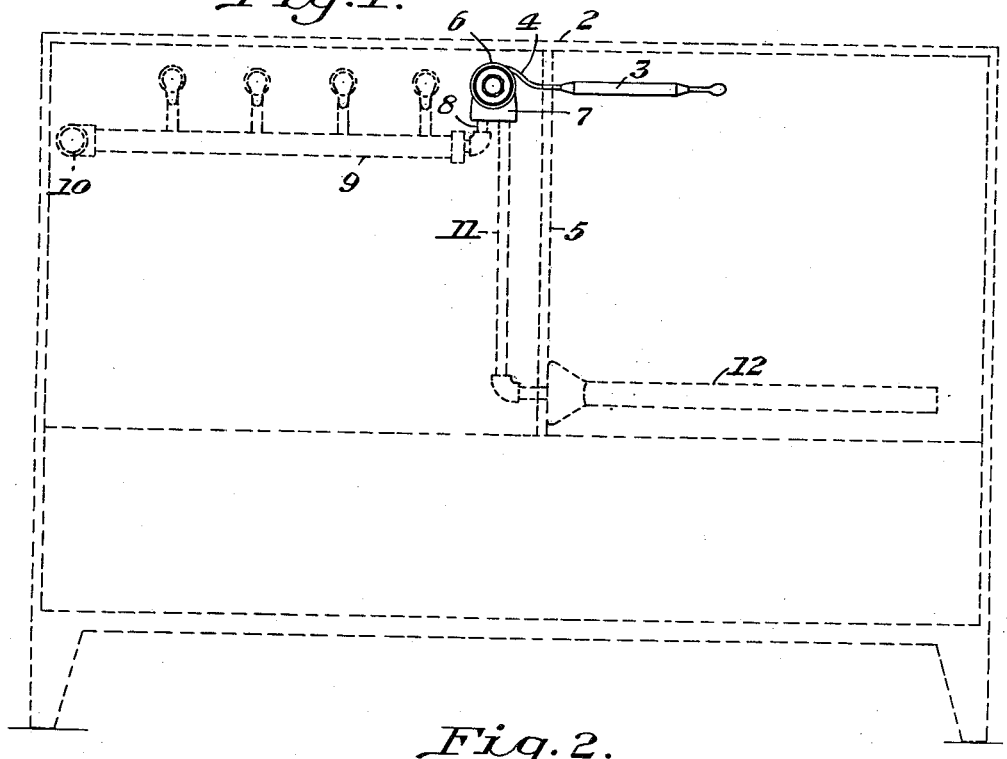
Figure 1 is a front elevational view of a gas range embodying our improved thermostat, the range and its component parts being shown in dotted lines.
Figure 2:
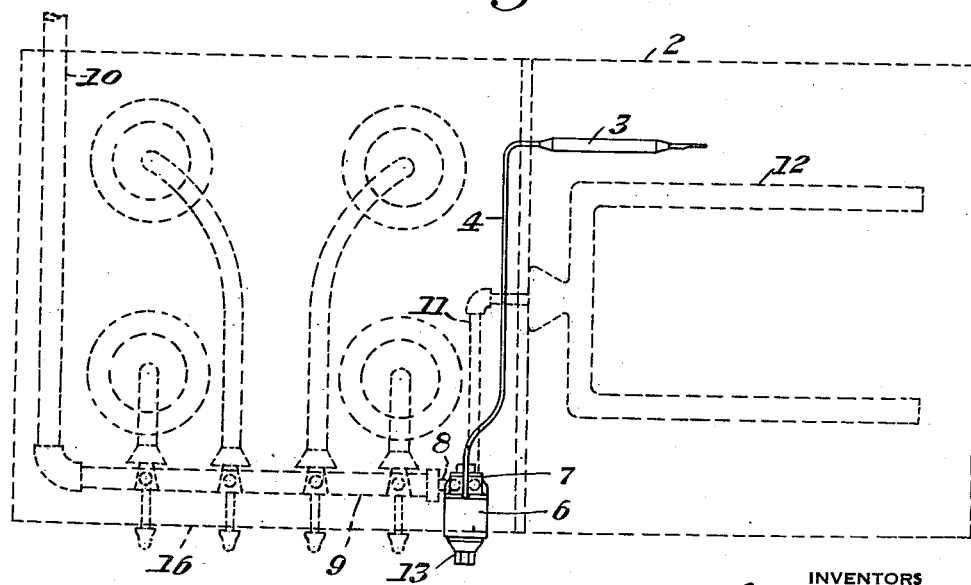
Figure 2 is a plan view of the structure shown in Figure 1, our improved thermostat being shown in full lines and the range and its component parts being shown in dotted lines.
Figure 7:
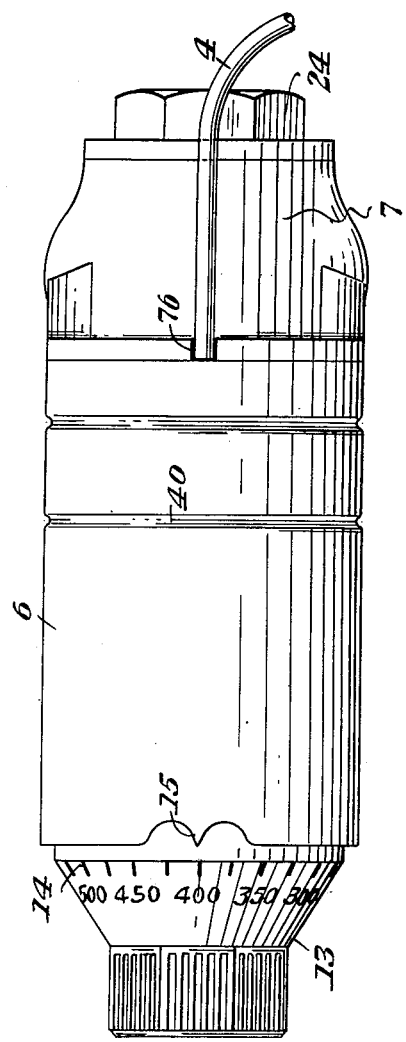
Figure 7 is a top plan view of the structure shown in Figure 3.

In Figures 1 and 2, our improved thermostat is shown mounted on a range indicated generally by the reference character 2. As shown in the drawings, the bulb 3 of the structure which we provide is located in the oven of the range. A capillary tube 4 connects the bulb 3 and the expansible bellows and extends through the side wall 5 of the oven structure at any convenient point. The capillary tube 4 may be of any desired length and bent to any suitable configuration in order to permit the mounting of the bulb 3 at the most desirable location in the oven. The capillary tube 4 is in communication with the bellows of the thermostatic structure which we provide, the bellows being mounted in a housing or casing 6 secured to the valve 7 which is conveniently located adjacent the front portion of the range.

The inlet side of the valve 7 is connected by piping 8 with the manifold 9 extending across the front portion of the hot top of the range. The manifold 9 is connected by suitable piping to a source of supply. The outlet side of the valve 7 is connected by suitable piping 11 to the burner 12 for heating the oven portion of the range.

The thermostat is provided with an adjusting dial 13 carrying suitable indicia 14 adapted to cooperate with a pointer 15 formed by the casing 6. For designating the setting of the thermostat, the dial 13, the casing 6, and the valve 7 are preferably so located that the dial 13 will project forwardly a sufficient distance from the front panel 16 of the stove to permit ready access to the adjusting dial. All of the thermostatic structure, with the exception of the dial 13 and that portion of the casing 6 carrying the pointer 15, may be located to the rear of the front panel 16 and out of sight of an observer.

Referring to Figures 3 to 6, inclusive, for a detailed description of the structure we provide, the valve 7 is provided with a valve member 20 adapted to cooperate with a valve seat 21. The valve member 20 is provided with a boss 22 adapted to center a spring 23, one end of which abuts against the valve member 20 and the other end against the cap 24. The cap 24 is provided with a threaded portion 25 adapted to cooperate with a threaded portion 26 of the valve 7 so that the cap 24 may be readily removed to permit access to the valve member 20 and its operating parts. The valve member 20 is provided with a valve stem 27 which extends through an opening 28 in the valve casing. The valve stem 27 is loosely pivoted in the valve member 20 so that longitudinal movement of the stem will effect an opening or closing action of the valve member for controlling flow between the inlet 8 and the outlet 11 of the valve.

The valve 7 is provided with an annular portion 30 adapted to cooperate with the housing or casing 6, which protects the bellows and the various operating parts from dust and local heat adjacent the apparatus. The valve casing 7 is provided with an upstanding projection 31 adjacent the annular portion 30, against which the housing 6 abuts.

The expansible bellows 32 is mounted on a base plate 33, which is substantially circular and of substantially the same diameter as the internal diameter of the casing or housing 6. The bellows 32 is shown in detail in Figure 6a. As shown therein, it comprises a plug 32', a head 32'', and a corrugated portion 32''', the corrugated portion extending around the edges of the head and holding it in position. The other end of the corrugated portion extends around a flange 34' on the plug. An opening 29 is provided in the plug to receive the capillary tube 4 and supply fluid to the bellows to expand it. A structure of this character, wherein a plug is used inside the bellows, is highly advantageous in that it reduces the size of the space within the bellows for receiving liquid. The cross-sectional area of the liquid space is considerably less than would be the case if the entire inside diameter of the bellows were filled with fluid. This is highly advantageous in that it permits a reduction in the length or number of corrugations in the bellows required, because it reduces the amount of bellows expansion occasioned by local heat adjacent the bellows assembly.

The plug 32' of the bellows is provided with a threaded extension 34 adapted to extend through a centrally located opening in the base plate. The bellows is secured to the base plate by means of a nut 35 threaded on the threaded portion 34 of the aforesaid plug.

The base plate 33 and the housing or casing 6 are secured to the casing of the valve 7 by means of screws 36 having heads 37 and threaded portions 38 adapted to operate with threaded openings 39 in the casing f the valve. The housing 6 is provided with an annular crimp 40 against which the edges of the base plate 33 abut when the base plate and casing are secured in place on the casing of the valve 7 by the screws 36.

In thermostatic structures of this character, it is necessary, of course, that the control valve close with rising temperatures. If the stationary end of the expansible bellows is remote from the valve body and the movable end closest to the valve body, it is necessary to use a lever to reverse the action of the bellows. If the stationary end of the bellows is adjacent the rear of the valve body and the movable end remote from the bellows, means must be provided which will pass around the bellows and transmit the movement of the movable end of the bellows to a point where it will operate the valve stem. We have found that this latter method is the most desirable method of mounting the bellows, as it eliminates the use of levers and the errors generally incident to structures of this character embodying lever systems of the various types which may be used. Furthermore, by mounting the bellows in such a manner that the stationary end is closest the rear of the valve body, proper alinement of the bellows and dial with the valve axis may be accomplished and a much more accurate and compact arrangement obtained.

In the structure described above, it will be apparent that the end of the bellows 32 mounted on the base plate 33 is stationary and the end of the bellows closest the adjusting dial 13 movable. The movement of the forward end of the bellows 32 is transmitted to the valve stem 27 by the mechanism now to be described. This mechanism also transmits adjustments from the adjusting dial 13 to the valve stem.

The forward end of the bellows 32 is provided with a bearing plate 45, against which the one end of the adjusting screw 46 abuts. The adjusting screw 46 is provided with a threaded portion 47 adapted to cooperate with a threaded portion 48 of an annular yoke 49 extending around the bellows 32. The end of the yoke opposite the threaded portion 48 is provided with an annular upstanding portion 50 having recesses 51 therein to permit access to the heads 37 of retaining screws 36. The annular portion 50 of the yoke 49 is provided with openings 52 adapted to receive supporting pins 53 having heads 54 thereon. Each supporting pin 53 extends through an opening 55 in the base plate 33 and through an opening 56 in the movable plate 57. Each supporting pin 53 is provided with a threaded portion 58 adjacent the movable plate 57, on which is threaded a nut 59 for retaining the pin 53 in place. A compression spring 60 is provided for each supporting pin 53. One end of each spring 60 abuts against a recessed portion 61 on the base plate 33, and the other end of each spring 60 abuts against a recessed portion 62 in the movable plate 57. These recesses are concentric with the adjacent supporting pin and serve to prevent the springs from contacting the guide or supporting pins. The springs 60 are compression springs and tend to retain the yoke 49 and the movable plate 57 in proper spaced relation. By means of this construction, the movable plate 57 and the yoke 49 are maintained an equal distance apart at all times.

The movable plate 57 is provided with a recessed portion 70, in which is mounted a bi-metal disc or strip 71 adapted to cooperate with the valve stem 27. As will be readily apparent, movement of the movable plate 57 in one direction or the other will effect movement of the valve stem 27 and the valve member 20. This bi-metal disc or strip is adapted to compensate for the effect of local heat upon the bellows, the housing, and the operating parts. If the structure is so located as to not be affected in any wise by local heat, this compensating element may be entirely eliminated. When a bi-metal disc or strip is not used, the valve stem will bear directly against the movable plate 57.

Sufficient clearance is preferably provided between the movable plate 57 and the housing 6 to prevent friction therebetween. However, if desired, the casing or housing may be so formed as to provide a guide for the movable plate.

This movable plate 57 also is provided with recesses 72, through which the mounting screws 36 project.

The adjusting screw 46 is provided with an adjusting dial 13. At the forward end thereof, the adjusting dial 13 is securely fastened to the adjusting screw 46 by means of a set screw 73. This adjusting dial 13, as stated above, may be provided with suitable graduations 14 adapted to cooperate with the pointer 15, which is formed in the housing or casing 6. A stop clip 74 is secured to the inner circumference of the housing and cooperates with a stop 75 carried by the dial to prevent rotation of the adjusting dial through more than 360°.

The capillary tube 4 containing the expansible fluid extends through a suitable opening 76 in the casing of the valve 7 between the casing and the housing 6 and through an opening in the movable plate 57 and a coincident opening in the base plate 33. This tube carries the expansible liquid for operating the bellows in accordance with the temperature of the medium or chamber the temperature of which is to be controlled.

A by-pass is provided in the valve 7 for the purpose of permitting a small amount of gas to be fed at all times past the valve member 20 for supplying fuel to a pilot light. The by-pass cap 77 encloses the by-pass key 78, the cap being threaded in the casing of the valve 7 so as to be readily removable to permit access to the key.

The operation of the structure above described will be readily apparent to those skilled in the art. The operation is as follows:

As the temperature in the chamber, the temperature of which is to be controlled, rises to that for which the thermostat is set to close the valve, the bellows 32 is caused to expand and the torward end thereof carrying the bearing plate 45 moves to the left, as shown in Figure 3, forcing the adjusting screw and the yoke 49 carried thereby to the left, as shown in this figure. As the yoke 49 moves forwardly, the movable plate 57 is pulled in the same direction by means of the supporting pins 53, and this, in turn, permits the spring 23 to force the valve member 20 to its seat 21, thereby cutting off the supply of fuel to the burner.

As the temperature in the chamber falls below the desired temperature, the bellows will contract and the springs 60 will force the movable plate 57 to the right, as shown in Figure 3, and this, in turn, will pull the yoke 49 in the same direction. Movement of the movable plate 57 in the direction indicated will effect an opening movement of the valve member 20.

When it is desired to set the structure just described to be operative at a certain temperature, the adjusting dial 13 is rotated in one direction or the other until the appropriate mark on the dial coincides with the pointer 15. If the adjusting dial is rotated in a clockwise direction, as viewed in Figure 3, the yoke 49 will move to the left and adjust the structure to be operative at a higher temperature than that for which it was previously set.

A housing of the character such as that which we provide is highly advantageous. It forms a pointer or indicator at its outer end; it carries the stop clip 74, which must always be at a relative angle or position with respect to the pointer; it serves as a guide for the moving mechanism within it; and effectually protects the internal mechanism from dirt or damage by accidental blows. Another particular advantage is that it serves to protect the bellows from direct contact with hot gases from adjacent burners, such as the hot top burners of a range. It also protects the dial 13, which moves in and out with the bellows, from binding upon any wall or panel through which it may be inserted.

Another particular advantage in the rigid tubular housing, such as that as provided by us, resides in the manner of attachment to the rear of the valve body. The tubular housing 6 is centered in alinement with the body so that the valve body may be rotated with respect thereto and the housing clamped against the body with the inlet and outlet ports in any desired position. This housing is secured to the body by screws which may be reached from the dial end of the structure, which is, of course, the front end of the device, so that it will be readily accessible for convenient removal by the user, thereby permitting easy replacement of the bellows assembly without disconnecting the valve and other operating parts, or without interfering with the manual use of the appliance to which it is attached.

It will be understood, of course, that any type of valve body may be used without altering the general design of the thermostatic unit. If desired, a switch mechanism, or any other type of control, may be substituted for the valve. The structure which we provide is of such character as to permit the positioning of the bellows element where it will not be subjected to the action of the gas or other heating fluid. There are certain well defined limits on the character of materials which can be used for such bellows and practically all of the metals which have been found suitable for manufacturing such structure are susceptible to corrosion in a sulphurous gas atmosphere. The structure which we provide is highly advantageous therefore over the prior art structure wherein the bellows is located in the path of the heating medium.

We have found that when the bellows is located so as to be not subjected to the heating medium it is frequently necessary to provide a compensating element for compensating local heat. The compensating element is also located outside the path of the heating medium and as near as possible to the bellows, so that the bi-metal compensating element and the bellows will be simultaneously affected by local heat and to substantially the same extent. It will be apparent that we have provided a structure of this character, wherein both the bellows and the bi-metal compensating element are positioned closely together and out of the path of the heating medium. We have found in actual practice that by so arranging the bellows and the compensating element, it is possible to limit errors to within 5 to 8° F. in a total of 500° F. oven temperature with an increased local temperature around the bellows of approximately 250° F. If it were necessary or even desirable to eliminate even this slight error, it could be done in a structure such as that above described, as response to local heat by the bi-metal element is practically instantaneous.

It will be understood, of course, that the bi-metal element is not an essential element in a structure of this character where the structure is located so as not to be subjected to local heat.

It will be readily apparent from the above description that the dial, the adjusting screw, the yoke, the bellows assembly, the movable plate, and the supporting pins and springs are all carried by the base plate 33, which is, in turn carried by the housing which is secured to the valve casing. A structure of this character is highly desirable in that it obviates all possibility of binding and obviates the necessity of lubrication at any time during the life of the structure. The adjusting screw in the structure which we provide does not act as a gas seal as is the case with a great many structures of this character. Consequently, it is free from lubrication, and there is no possibility whatever of the adjusting screw sticking or binding.

Another advantage of the structure whch we provide which has not heretofore been pointed out is that the structure will continue to operate and operate satisfactorily even though the bi-metal compensating element fails. The structure will continue to operate, the only loss being that it will not effect a compensation for local heat. The chances of failure in the bi-metal compensating element used in our structure are rather remote, however, as it is located without the gas passage, and, consequently, is subjected to no corrosive action whatever by the gas.

Another particular advantage of the structure which we provide resides in the flexibility thereof. The adjusting screw in the casing may be extended to any desired length in order to permit location in a range in the most desirable and most feasible position. Furthermore, the casing itself need not be extended in order to give a greater distance between the adjusting dial and the valve, for a suitable cap can be placed over the front end of the casing and the adjusting screw extended to any desired length and the dial positioned at the most convenient location. It will be understood, of course, that various types of connections between the adjusting dial and the yoke may be utilized.

Figure 8:
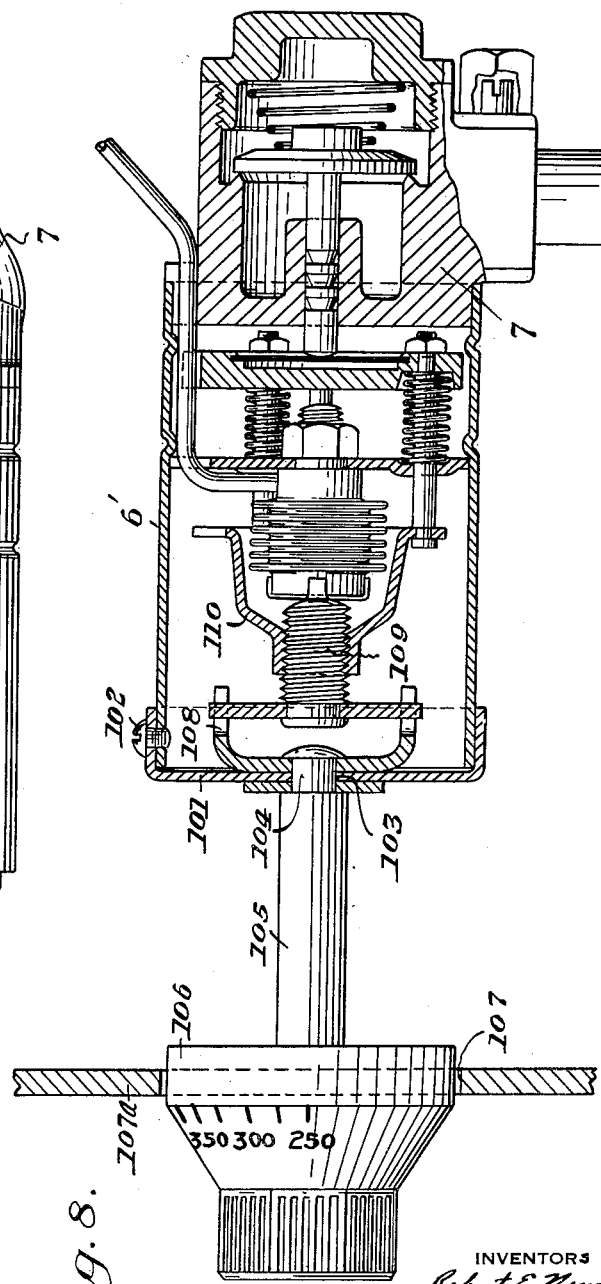
Figure 8 is a sectional view, partly in elevation and partly broken away, of a modified form of our invention.

In Figure 8, we have shown a modified form of our invention embodying a different type of connection between the adjusting dial and the yoke and also a capped casing. In Figure 8, the casing or housing 6' is provided with a cap 101, which is rigidly secured to the housing by screws 102. The cap 101 has a centrally disposed opening 103 therein adapted to receive the reduced portion 104 of the adjusting screw 105. The adjusting screw 105 carries a dial 106 extending through an opening 107 in the front panel 108 of the stove or other structure to which it is attached. A pointer (not shown) may be provided on the panel 108 for cooperation with suitable indicia carried by the dial 106.

A tang connection 108 is provided between the adjusting screw 105 and the screw 109 carrying the yoke 110. This tang connection is of such character as to transmit rotary motion from the adjusting screw 105 to the threaded screw 109 carrying the yoke. It is also of such character as to not transmit longitudinal movement of the threaded screw 109 to the adjusting dial 106. By an arangement of this character, the adjusting dial will remain stationary at all times. There is very little advantage in a structure wherein the longitudinal movement of the bellows is not transmitted to the adjusting dial over a structure wherein it is so transmitted. Some, however, prefer that the adjusting dial be stationary under all circumstances.

A large number of the advantages of our improved thermostatic structure have been pointed out above. Other advantages, however, will be apparent to those skilled in the art.

While we have shown and described a preferred embodiment and one modification of our device, it will be understood that we do not intend to be limited by these drawings, as our invention may be otherwise embodied within the scope of the appended claims.

We claim:

1. A thermostatic structure comprising control means, a thermostatic unit for operating said control means, means for supporting said thermostatic unit including a housing therefor, adjusting means carried by said thermostatic unit, and clamping means within said housing accessible from the outer end thereof for rigidly securing said thermostatic unit and said housing rigidly to said control means.

2. A thermostatic structure comprising control means, a bellows assembly for operating said control means, means for supporting said bellows assembly including a housing therefor, adjusting means carried by said bellows assembly, and clamping means within said housing accessible from the outer end thereof for rigidly securing said bellows assembly and said housing rigidly to said control means.

3. A thermostatic structure comprising a valve casing having a valve member therein for controlling fluid flow therethrough, a thermostatic unit for operating said valve member, said thermostatic unit being located externally of said valve casing, means for transmitting motion from said unit to said valve member, means for supporting said unit including a protective housing therefor, and means for clamping said housing to the valve casing in any desired radial position relative to said casing.

4. A thermostatic structure comprising a valve casing having a valve member therein for controlling fluid flow therethrough, a bellows assembly for operating said valve member, said bellows assembly being located externally of said valve casing, means for transmitting motion from said bellows assembly to said valve member, means for supporting said bellows assembly including a protective housing therefor, and means for clamping said housing to the valve casing in any desired radial position relative to said casing.

5. A thermostatic structure comprising control means, a bellows assembly for operating said control means, means for supporting said bellows assembly, said bellows assembly including an expansible bellows, a yoke extending at least partially around said bellows and arranged to be actuated by the movable end of said bellows, a base plate to which one end of the bellows is rigidly secured, a movable plate, and means for rigidly connecting said movable plate to said yoke in fixed spaced relationship, means for transmitting movement of said movable plate to said control means, and means carried by said bellows assembly for adjusting said yoke relative to said bellows.

6. A thermostatic structure comprising control means, a bellows assembly for operating said control means, means for supporting said bellows assembly, said bellows assembly including a yoke extending at least partially around said bellows and arranged to be actuated by the movable end of said bellows and means including a plurality of springs for maintaining said yoke in operative connection with said bellows, means connected with said yoke for transmitting movement thereof to said control means, and adjusting means for adjusting said yoke relative to said bellows.

7. A thermostatic structure comprising control means, a bellows assembly for operating said control means, means for supporting said bellows assembly, said bellows assembly including an expansible bellows, a yoke extending at least partially around said bellows and arranged to be actuated by the movable end of said bellows, a base plate to which one end of said bellows is rigidly secured, a movable plate, and means for rigidly connecting said movable plate to said yoke in fixed spaced relationship, said means including a plurality of guide pins extending between said yoke and said movable plate, and a spring positioned concentric with each of said pins and adapted to bear in recesses in said base plate and said movable plate arranged concentrically with said pins, and means for transmitting movement of said movable plate to said control means.

8. A thermostatic structure comprising control means, a bellows assembly for operating said control means, means for supporting said bellows assembly, said bellows assembly including an expansible bellows, a yoke extending at least partially around said bellows and arranged to be actuated by the movable end of said bellows, a base plate to which one end of said bellows is rigidly secured, a movable plate, and means for rigidly connecting said movable plate to said yoke in fixed spaced relationship, said means including a plurality of guide pins extending between said yoke and said movable plate, and a spring positioned concentric with each of said pins and adapted to bear in recesses in said base plate and said movable plate arranged concentrically with said pins, means for transmitting movement of said movable plate to said control means, and means for adjusting said yoke relative to said bellows.

ROBERT E. NEWELL.
CLARENCE W. ROBERTSHAW.
WM. B. MACKINTOSH.